United States Patent
Ishihara et al.

(10) Patent No.: US 6,863,705 B2
(45) Date of Patent: Mar. 8, 2005

(54) EXHAUST GAS PURIFYING FILTER AND MANUFACTURING METHOD THEREFOR

(75) Inventors: Mikio Ishihara, Kariya (JP); Mamoru Nishimura, Nagoya (JP)

(73) Assignee: Denso Corporation (JP)

( * ) Notice: Subject to any disclaimer, the term of this patent is extended or adjusted under 35 U.S.C. 154(b) by 3 days.

(21) Appl. No.: 10/224,629

(22) Filed: Aug. 21, 2002

(65) Prior Publication Data

US 2003/0041575 A1 Mar. 6, 2003

(30) Foreign Application Priority Data

| Aug. 28, 2001 | (JP) | ........................................ | 2001-258507 |
| May 15, 2002 | (JP) | ........................................ | 2002-140242 |
| Jul. 11, 2002 | (JP) | ........................................ | 2002-202924 |

(51) Int. Cl.$^7$ ............................................ B01D 46/00
(52) U.S. Cl. .................... 55/523; 55/385.3; 55/DIG. 5; 55/DIG. 30; 60/311; 264/628; 264/630; 264/638; 264/655; 264/670; 264/177.12; 264/209.3; 264/210.1; 264/DIG. 48
(58) Field of Search ................................. 55/385.3, 523, 55/DIG. 5, DIG. 30; 60/311; 428/116; 264/44, 628, 630, 631, 638, 639, 654, 655, 670, 177.12, 209.3, 209.4, 210.1, 210.2, 210.3, 210.4, DIG. 48

(56) References Cited

U.S. PATENT DOCUMENTS

| 4,416,676 | A | * | 11/1983 | Montierth | .................... | 55/523 |
| 4,643,749 | A | * | 2/1987 | Miura | ........................... | 55/523 |
| 4,695,301 | A | | 9/1987 | Okajima et al. | | |
| 4,732,593 | A | * | 3/1988 | Kondo et al. | .................. | 55/523 |
| 4,740,408 | A | * | 4/1988 | Mochida et al. | .............. | 55/523 |
| 6,548,142 | B1 | * | 4/2003 | Kar et al. | .................... | 264/630 |

FOREIGN PATENT DOCUMENTS

| DE | 40 02 649 A | 8/1991 | |
| EP | 0 692 995 B1 | 7/1997 | |
| JP | A-8-508199 | 9/1996 | |
| JP | A-10-57730 | 3/1998 | |
| JP | 10-57730 | * 3/1998 | ........... B01D/39/20 |
| WO | 94/22556 | 10/1994 | |

* cited by examiner

Primary Examiner—Duane Smith
Assistant Examiner—Jason M. Greene
(74) Attorney, Agent, or Firm—Nixon & Vanderhye PC

(57) ABSTRACT

A ceramic material containing organic binder is formed by extrusion, dried and cut off so as to make the honeycomb body 100 having the bulkheads 11 and a plurality of cells 12 partitioned by the bulkheads 11 and penetrating between both end faces of the honeycomb body 100. The tapered jig 3 having a tapered forward end portion 31 is inserted into the opening 13 of the cell 12 of the honeycomb body 100. Then, the bulkheads 11 are heated and softened and deformed by a pushing force given by the tapered jig 3 so that the opening 13 of the cell 12 is expanded to form the large opening 131, and the opening 13 of the adjoining cell 12 is reduced at the same time so as to form the small opening 132. After that, the honeycomb body 100 is fired. In this way, the exhaust gas purifying filter for collecting particulates is manufactured.

15 Claims, 15 Drawing Sheets

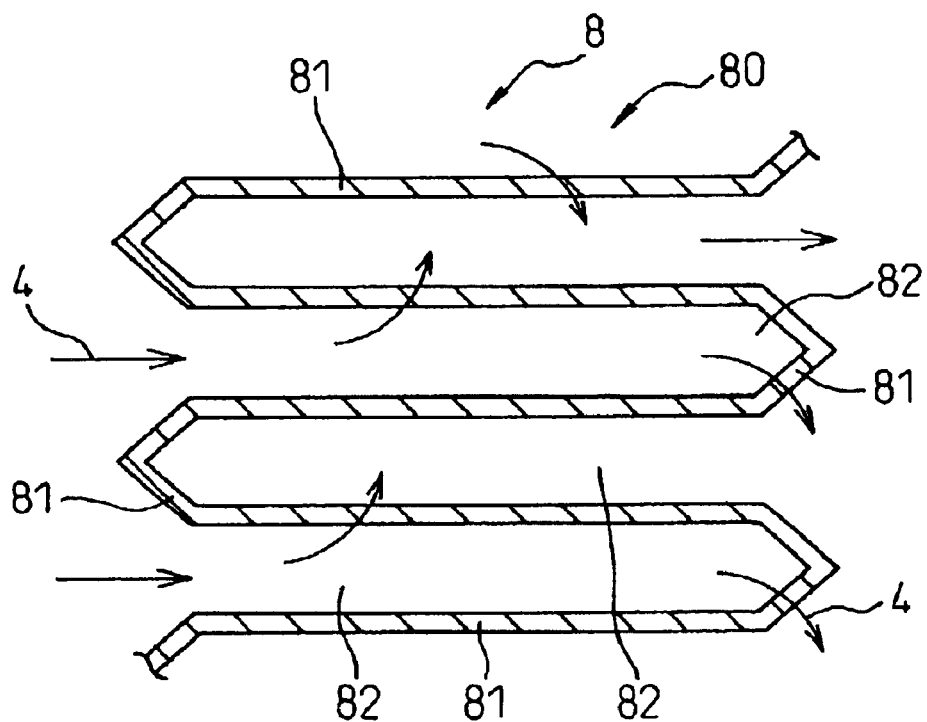

EXHAUST GAS PURIFYING FILTER AND MANUFACTURING METHOD THEREFOR

BACKGROUND OF THE INVENTION

1. Field of the Invention

The present invention relates to an exhaust gas purifying filter, and manufacturing method therefor, for collecting particulates contained in exhaust gas exhausted from an internal combustion engine so that the exhaust gas can be purified.

2. Description of the Related Art

Conventionally, there has been provided an exhaust gas purifying filter for collecting particulates contained in exhaust gas exhausted from an internal combustion engine so that the exhaust gas can be purified. For example, as shown in FIGS. 11 and 12, the exhaust gas purifying filter is composed of a honeycomb structure 90 having cells 92, and a plug member 94 is arranged at one end of each cell 92.

When the exhaust gas 4 is purified with the exhaust gas purifying filter 9 described above, as shown in FIG. 12, the exhaust gas 4 is introduced into each cell 92 from the opening portion 93 of the cell 92 arranged on one end face 991 of the exhaust gas purifying filter 9. The exhaust gas 4 introduced into the cell 92 passes through the bulkhead 91 and moves into the adjoining cell 92. At this time, particulates in the exhaust gas 4 are collected by the bulkhead 91, so that the exhaust gas 4 can be purified. For example, when a catalyst is held by the bulkhead 91, the thus collected particulates can be decomposed and removed by a catalytic reaction of the catalyst.

The purified exhaust gas 4 is exhausted from the opening portion 93 of the cell 92 arranged on the other end face 992 of the exhaust gas purifying filter 9.

In this way, the exhaust gas 4 can be purified by the exhaust gas purifying filter 9.

However, the following problems may be encountered in the above conventional exhaust gas purifying filter 9.

The aforementioned plug member 94 is arranged in one of the opening portions 93 of the cell 92. Usually, this plug member 94 has no particulate collecting function. For the above reasons, the portion of the plug member 94, that is, one end portion of the cell 92 cannot be effectively used as a filter. Accordingly, there is a possibility that the purifying efficiency of purifying the exhaust gas 4 is not sufficiently high.

Further, there is a possibility that the following problems may be encountered. Particulates are concentrated upon and accumulated in portions close to both end faces 991, 992 of the exhaust gas purifying filter 9, and the opening portion 93 of the cell 92 is clogged.

In order to solve the above problems, as shown in FIG. 13, there is disclosed a filter 8 in which the bulkhead 81 is deformed so as to close one end portion of the cell 82 (Published Japanese translations of PCT international publication No. 8-508199).

In this filter 8, one end portion of the cell 82 is blocked by the bulkhead 81 having a function of collecting particulates. Even at this one end portion of the cell 82, when the exhaust gas passes through the bulkhead 81, it is possible to purify the exhaust gas 4. Therefore, the purifying efficiency of purifying the exhaust gas 4 can be enhanced.

However, when the bulkhead 81 is deformed as described above, extrusion molding is conducted to form a honeycomb body, and then deforming is conducted on the dried honeycomb body. Accordingly, it is necessary to give a high intensity pushing force to the end portion of the bulkhead 81. For the above reasons, it is difficult to smoothly deform the bulkhead 81 into a desired profile.

Further, another method is disclosed in which the bulkhead 81 is soaked in a soaking liquid so that the bulkhead 81 can be easily deformed, and then the bulkhead 81 is pressed and deformed. However, this method is disadvantageous because it is necessary to newly provide a soaking process, and the soaking can be time-consuming. Therefore, the production efficiency is deteriorated.

SUMMARY OF THE INVENTION

The present invention has been accomplished to solve the above problems. It is an object of the present invention to provide an exhaust gas purifying filter, the purifying efficiency of which is high, capable of being easily manufactured, wherein exhaust gas can be smoothly introduced into and discharged from the exhaust gas purifying filter. It is another object of the present invention to provide a manufacturing method of manufacturing the exhaust gas purifying filter.

An aspect of the present invention is a method of manufacturing an exhaust gas purifying filter, for purifying exhaust gas by collecting particulates contained in exhaust gas exhausted from an internal combustion engine, comprising the steps of: making a honeycomb structure having bulkheads, which are formed into a honeycomb-shape, and also having a plurality of cells, which are partitioned by the bulkheads and penetrate both end faces, when ceramic material containing organic binder is formed into the honeycomb structure by extrusion, dried and cut into a predetermined length; inserting a tapered jig having a tapered forward end portion into an opening portion of the cell of the honeycomb structure; heating the bulkheads so as to soften them; deforming the bulkheads by a pushing force given from the tapered jig so that the opening portion of the cell is expanded and a large opening portion is formed and an opening portion of the adjoining cell is reduced; and firing the honeycomb structure.

The ceramic material composing the bulkhead contains an organic binder. Therefore, the bulkhead can be softened when it is heated. When the bulkhead is given a pushing force under the condition that it is heated and softened, the bulkhead can be easily deformed.

In this case, the above pushing force is given by the tapered jig inserted into the opening portion of the cell of the honeycomb body. The bulkheads are deformed by the above pushing force. Therefore, the bulkheads in the periphery of the cell, into which the tapered jig is inserted, are greatly expanded outside along the tapered shape of the forward end portion of the tapered jig. For the above reasons, the opening portion of the cell, into which the tapered jig is inserted, becomes a large opening portion as described above. On the other hand, the bulkheads of the opening portion of the adjoining cell are necessarily deformed inside, and the opening portion is reduced.

As described above, in the exhaust gas purifying filter provided by the above manufacturing method, the large opening is formed at one end of the cell. Therefore, even if particulates accumulate on the end face of the exhaust gas purifying filter, a sufficiently large area of the opening portion of the cell can be ensured, and exhaust gas can be smoothly introduced and discharged.

In the exhaust gas purifying filter provided by the above manufacturing method, one end portion of the cell is reduced. Therefore, the exhaust gas introduced from the large opening portion into the cell is restricted from flowing out from the opening portion of the other end portion and passes through the bulkheads and moves to the adjoining cell. Due to the foregoing, particulates contained in the exhaust gas are collected by the bulkheads. Therefore, the purifying efficiency can be enhanced.

As described above, according to the present invention, it is possible to provide a method of manufacturing an exhaust gas purifying filter characterized in that: the purifying efficiency is high; the exhaust gas can be smoothly introduced and discharged; and the exhaust gas purifying filter can be easily manufactured.

Another aspect of the present invention is an exhaust gas purifying filter for collecting particulates contained in exhaust gas exhausted from an internal combustion engine so as to purify the exhaust gas, comprising a honeycomb structure having honeycomb-shaped bulkheads and also having a plurality of cells partitioned by the bulkheads and penetrating both end faces, wherein each cell has a large opening portion which is formed by expanding one opening portion and also has a small opening portion which is formed by reducing the other opening portion, the large opening portion and small opening portion are arranged adjacent to each other on both end faces of the honeycomb structure, and a relation between area A of the large opening portion and area B of the small opening portion is expressed by an inequality of $0<B/A\leq0.25$.

In the above exhaust gas purifying filter, the small opening portion is formed at one end portion of the cell. Therefore, the exhaust gas introduced into the cell is restricted from flowing out from the small opening portion and passes through the bulkheads and moves to the adjoining cell. Due to the foregoing, particulates contained in the exhaust gas are collected by the bulkheads.

The above small opening portion is formed by deforming the bulkheads having a function of collecting particulates. Therefore, when the exhaust gas passes through the bulkheads at the end portion of the cell, that is, in the periphery of the small opening portion, the exhaust gas can be sufficiently purified. Therefore, the exhaust gas purifying efficiency can be enhanced.

In the exhaust gas purifying filter, the large opening portion is formed at one end of the cell. Therefore, even if particulates accumulate on the end face of the exhaust gas purifying filter, a sufficiently large area of the opening portion of the cell can be ensured, and exhaust gas can be smoothly introduced and discharged.

The relation between area A of the large opening portion and area B of the small opening portion is expressed by an inequality of $0<B/A\leq0.25$. Therefore, the exhaust gas can be smoothly introduced and discharged, and further the exhaust gas purifying efficiency can be enhanced.

As described above, according to the present invention, it is possible to provide an exhaust gas purifying filter, the purifying efficiency of which is high, capable of smoothly introducing and discharging exhaust gas.

The present invention may be more fully understood from the description of preferred embodiments of the invention, as set forth below, together with the accompanying drawings.

BRIEF DESCRIPTION OF THE DRAWINGS

In the drawings:

FIG. 21 is a sectional schematic illustration of an exhaust gas purifying filter of another conventional example.

DESCRIPTION OF THE PREFERRED EMBODIMENTS

Embodiment 1

Referring to FIGS. 1 to 7, an exhaust gas purifying filter and method of manufacturing the exhaust gas purifying filter of an embodiment of the present invention will be explained below.

Figure 7:
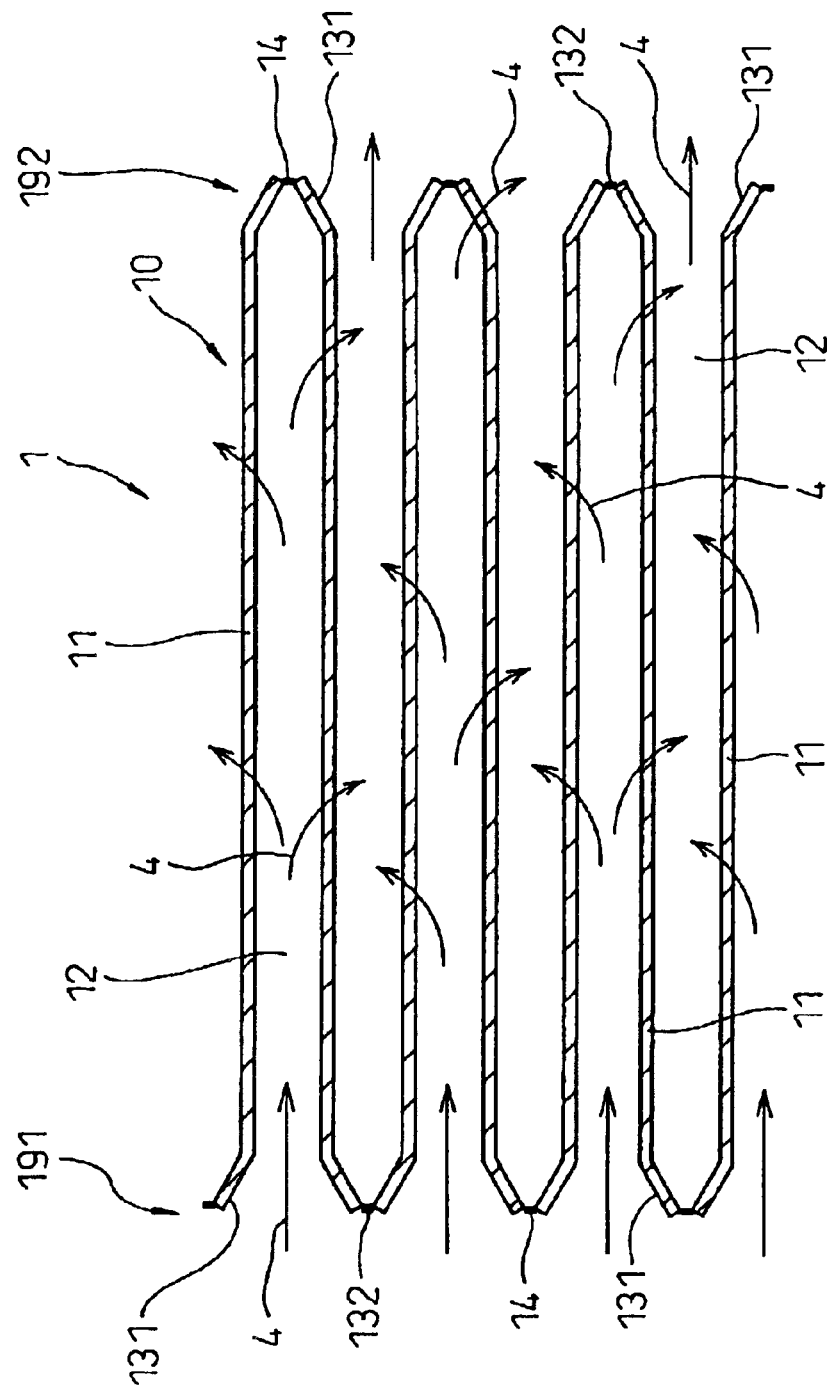
FIG. 7 is a sectional schematic illustration showing an exhaust gas purifying filter in Embodiment 1.

According to the method of manufacturing the exhaust gas purifying filter of this embodiment, as shown in FIG. 7, particulates contained in the exhaust gas 4, which is discharged from an internal combustion engine such as a Diesel engine, are collected so that the exhaust gas 4 can be purified by the exhaust gas purifying filter 1.

Figure 2:
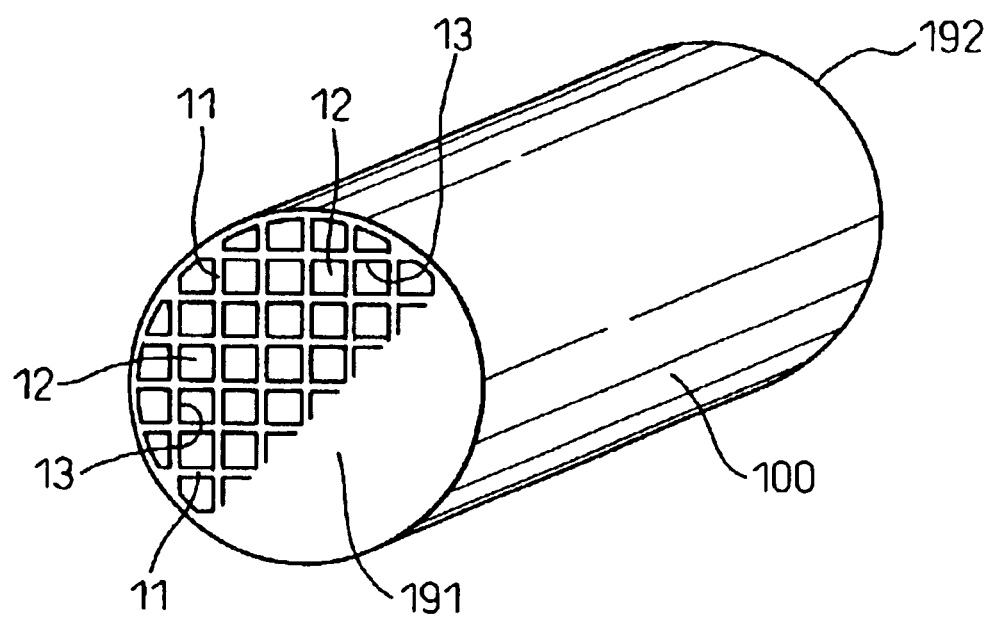
FIG. 2 is a perspective view showing a honeycomb structure of Embodiment 1 of the present invention.
Figure 3A:
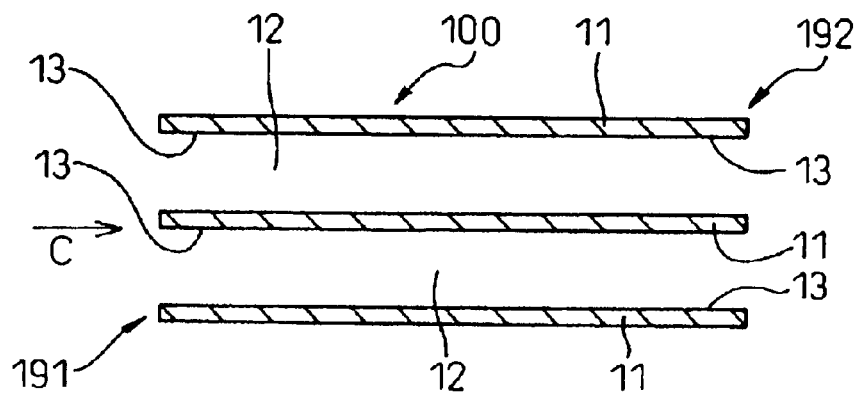
FIG. 3A is a sectional schematic illustration showing a honeycomb structure of Embodiment 1.
Figure 4:
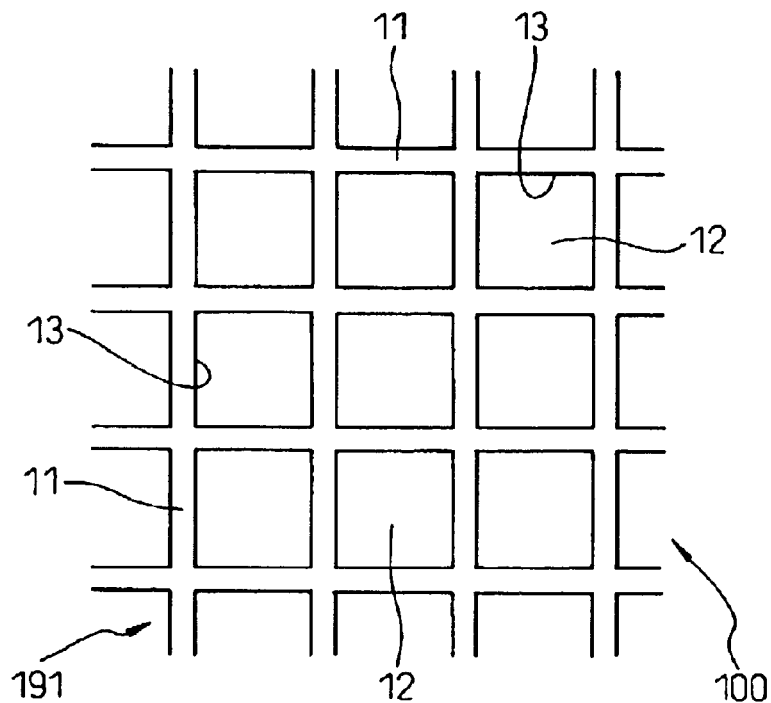
FIG. 4 is a view taken in direction C in FIG. 3A.

First, ceramic materials containing organic binder and thermo-plastic resin are formed into a honeycomb structure by extrusion and dried and cut into a predetermined length, so that the honeycomb body 100 shown in FIG. 2 is made. As shown in FIGS. 2, 3A and 4, the honeycomb body 100 includes honeycomb-shaped bulkheads 11 and a plurality of cells 12 which are partitioned by the bulkheads 11 and penetrate both end faces 191, 192.

Figure 1:
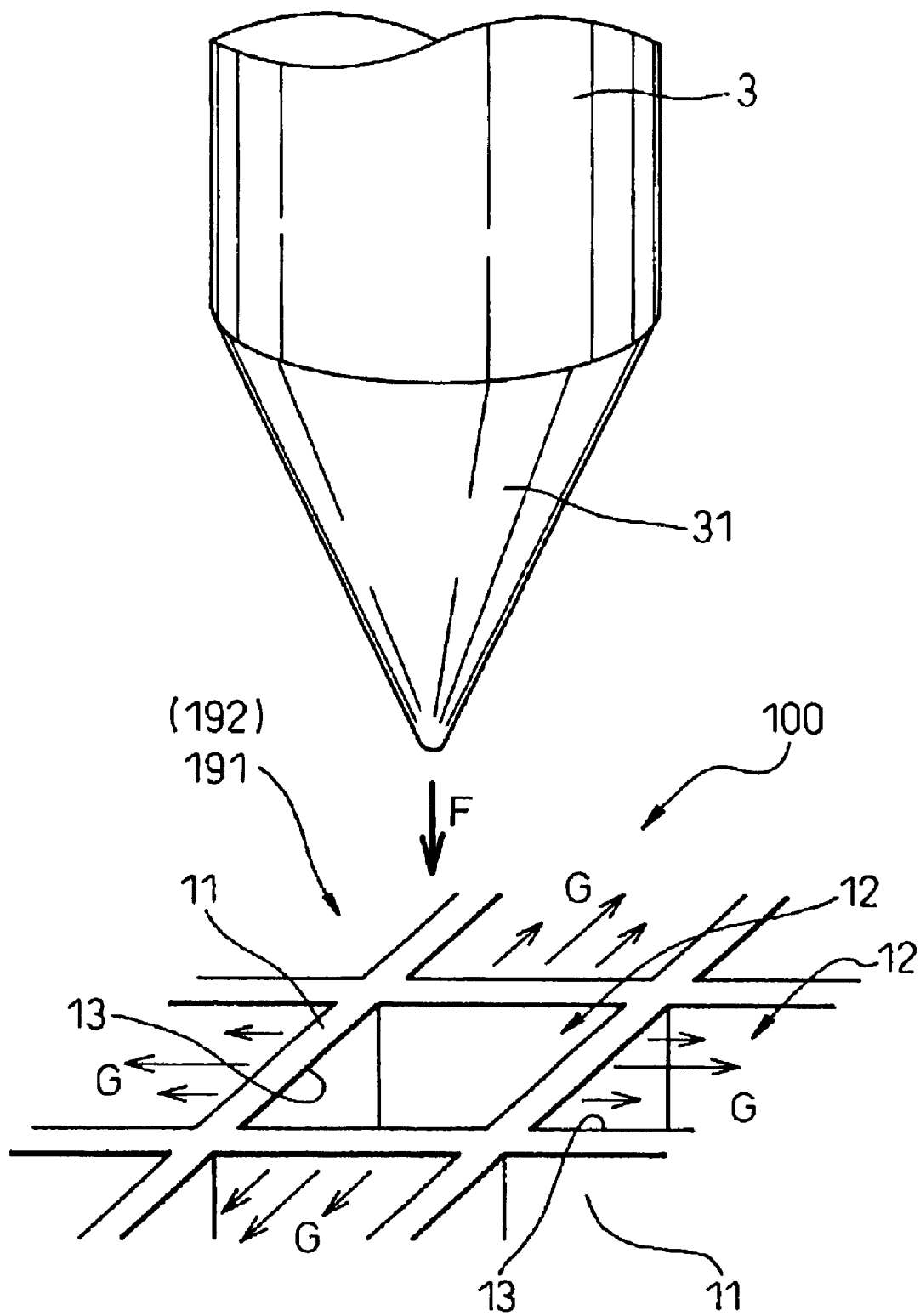
FIG. 1 is a schematic illustration of a method of manufacturing an exhaust gas purifying filter of Embodiment 1 of the present invention.
Figure 3B:
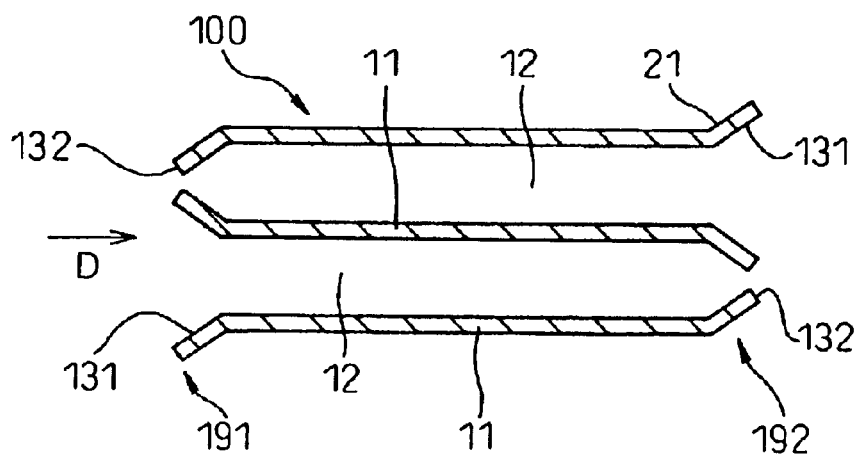
FIG. 3B is a sectional schematic illustration showing a honeycomb structure of Embodiment 1, the bulkheads of which are deformed.
Figure 5:
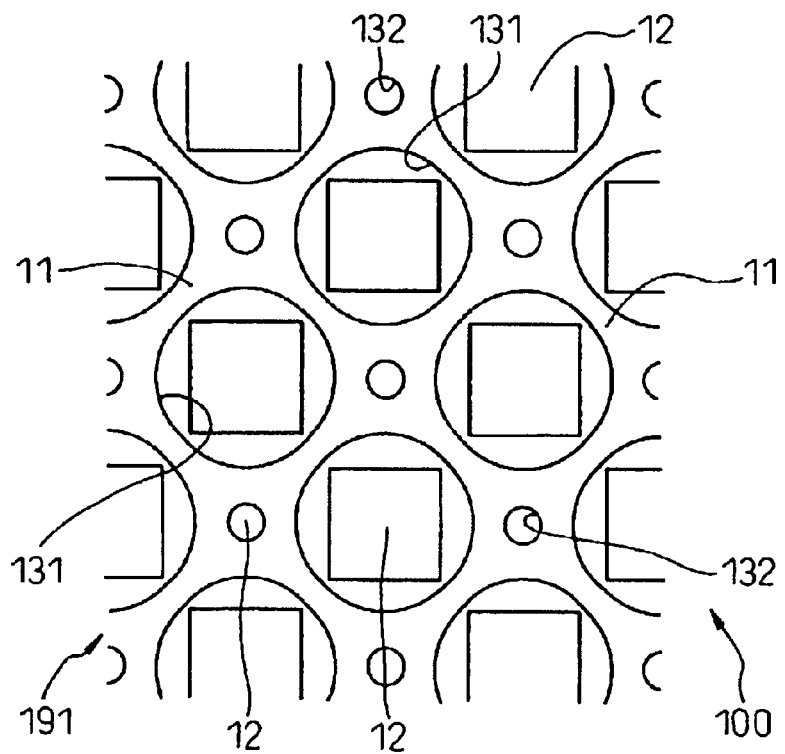
FIG. 5 is a view taken in direction D in FIG. 3B.

Next, as shown by arrow F in FIG. 1, the tapered jig 3 having a tapered forward end portion 31 is inserted into the opening portion 13 of the cell 12 of the honeycomb body 100, and at the same time the bulkheads 11 are heated and softened. Then, the bulkheads 11 are deformed by a pushing force of the tapered jig 3 as shown by arrow G in FIG. 1. Due to the foregoing, as shown in FIGS. 3B and 5, the opening portion 13 of the cell 12 is expanded so as to form the large opening portion 131, and the opening portion 13 of the adjoining cell 12 is reduced so as to form the small opening portion 132.

The bulkheads 11 are heated in such a manner that the heated tapered jig 3 is contacted with the bulkheads 11. As shown in FIG. 1, the forward end portion 31 of the tapered jig 3 is substantially conical.

Figure 3C:
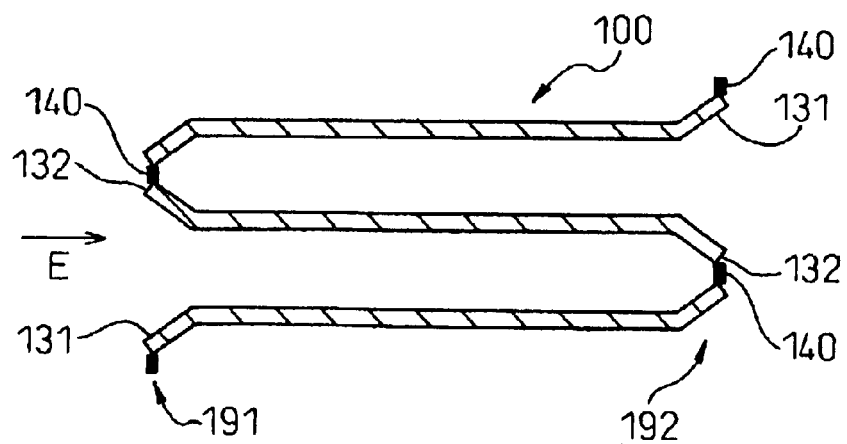
FIG. 3C is a sectional schematic illustration showing a honeycomb structure of Embodiment 1, in the small opening portion of which paste for forming a plug member is provided.
Figure 6:
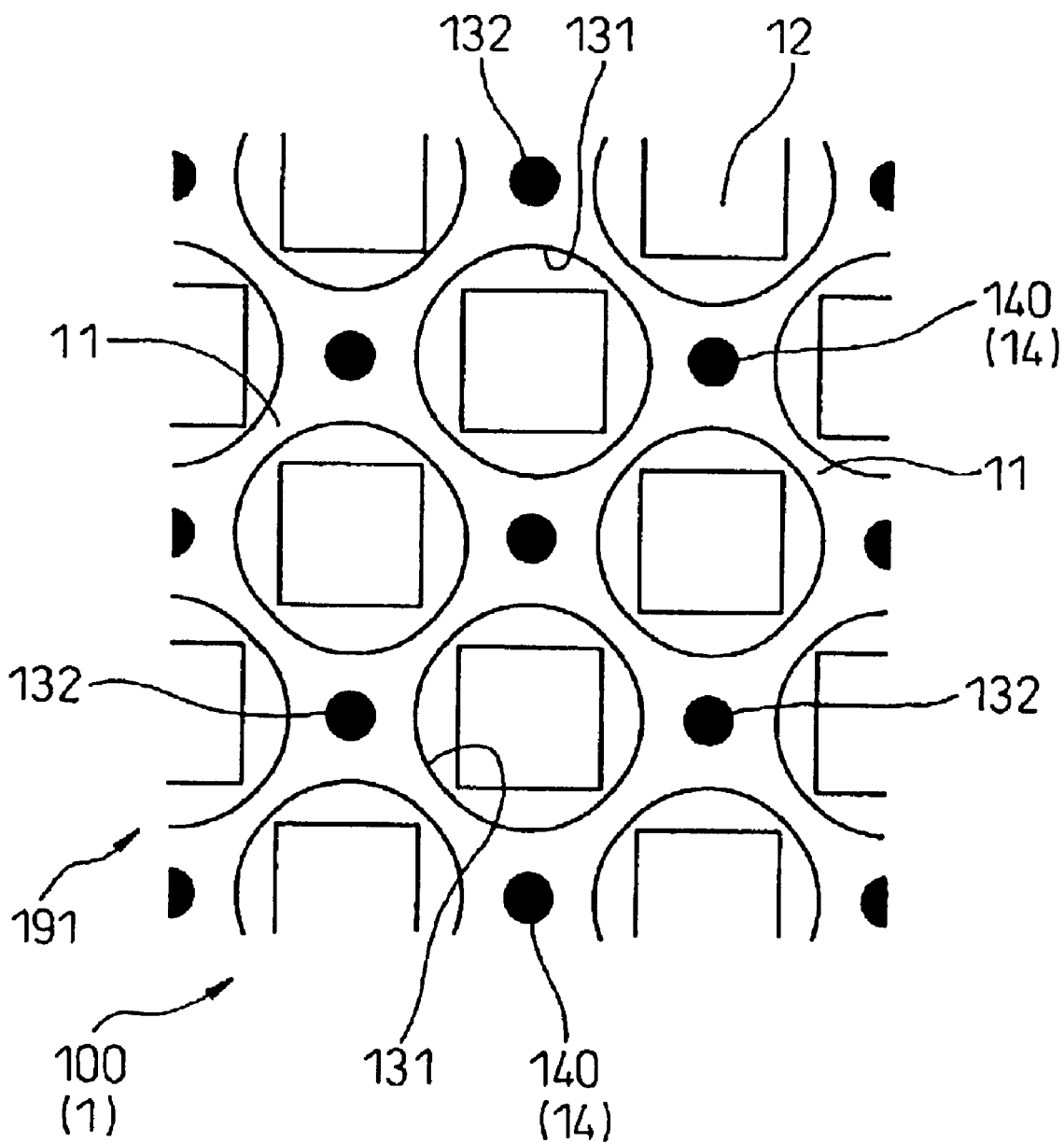
FIG. 6 is a view taken in direction E in FIG. 3C.

As shown in FIGS. 3C and 6, the paste 140 which becomes a plug member 14 to block the small opening 132 is coated in the small opening portion 132 of the honeycomb body 100.

After that, the honeycomb body 100 is fired. In this way, the aforementioned exhaust gas purifying filter 1 is manufactured as shown in FIG. 7.

A relation between area A of the large opening portion 131 and area B of the small opening portion 132 before firing is expressed by an inequality of $0 < B/A \leq 0.25$.

Examples of the above thermo-plastic resin are acrylate resin, stearic acid methyl, vinyl chloride resin and others.

Examples of the above organic binder are methyl cellulose, hydroxy methyl cellulose and others.

As shown in FIGS. 6 and 7, the exhaust gas purifying filter 1 provided by the above manufacturing method has a honeycomb structure 10 including: honeycomb-shaped bulkheads 11; and a plurality of cells 12 partitioned by the bulkheads 11 and penetrating both end faces 191, 192.

In this connection, FIG. 6 is a schematic illustration of the honeycomb body 100 before baking. Also, FIG. 6 is a schematic illustration of the exhaust gas purifying filter 1 (honeycomb structure 10).

Each cell 12 includes: a large opening portion 131 which is formed by expanding one opening portion 13; and a small opening portion 132 which is formed by reducing the other opening portion 13.

On both end faces 191, 192 of the honeycomb structure 10, the large opening portions 131 and small opening portions 132 are mixedly existing so as to be adjacent to each other.

A relation between area A of the large opening portion 131 and area B of the small opening portion 132 is expressed by an inequality of $0 < B/A \leq 0.25$. That is, even after the honeycomb body 100 has been fired and formed into the exhaust gas purifying filter 1 (honeycomb structure 10), the relation $0 < B/A \leq 0.25$ can be maintained.

As shown in FIGS. 6 and 7, the small opening portion 132 is blocked by the plug member 14.

The above bulkheads 11 hold a catalyst for decomposing and removing particulates collected by the bulkheads 11.

As shown in FIG. 7, in the above exhaust gas purifying filter 1, the exhaust gas 4, discharged from an internal combustion engine such as a Diesel engine, is introduced from the large opening portion 121 on one end face 191 into the cell 12. The small opening portion 132 of the cell 12 on the other end face 192 is blocked. The bulkheads 11 are porous, that is, the bulkheads 11 have a large number of small holes.

For the above reasons, as shown in FIG. 7, the exhaust gas 4 introduced into the cell 12 passes through the bulkheads 11. At this time, particulates such as carbon particles contained in the exhaust gas 4 are collected by the bulkheads 11, so that the exhaust gas 4 can be purified. The particulates collected by the bulkheads 11 are decomposed and removed by the catalytic action of the catalyst held by the bulkheads 11.

An example of the method of manufacturing the exhaust gas purifying filter 1 will be more specifically explained below.

First, a predetermined quantity of ceramic material such as talc, silica, kaolin, alumina and aluminum hydroxide and also a predetermined quantity of pore-forming material such as carbon and resin are prepared and compounded so that it can be a cordierite composition. Then, organic binder such as methyl cellulose and water are added to it and mixed and kneaded so that it can be made into clay.

The thus obtained clay is extruded and formed into a honeycomb shape by a vacuum extruder and then dried and cut into a predetermined length.

On both end faces 191, 192 of the thus obtained honeycomb body 100 shown in FIGS. 2, 3A and 4, the bulkheads 11 at the opening portion 13 of the cell 12 are deformed with the tapered jig 3 as described before as shown in FIG. 1. At this time, deformation is conducted under the condition that the bulkheads 11 are heated at 100 to 500° C. and softened.

In this way, the opening portion 13 of the cell 12 is formed into the large opening portions 131 and small opening portions 132 as shown in FIGS. 3B and 5. As shown in FIG. 5, the large opening portions 131 and small opening portions 132 are arranged on the end faces 191, 192 of the honeycomb body 100 in a checkered pattern.

Next, when both end faces 191, 192 of the honeycomb body 100 are dipped in paste made of cordierite and alumina, the end faces 191, 192 are coated with the paste. In this case, since an opening area of the small opening portion 132 is small, the paste 140 coated on the end faces 191, 192 blocks the small opening portion 132 by the action of its surface tension. On the other hand, as an opening area of the large opening portion 131 is large, there is no possibility that the paste 140 blocks the large opening portion 131. As described above, the paste 140 is mainly concentrated upon and coated in the small opening portion 132, so that the small opening portion 132 can be blocked as shown in FIGS. 3C and 6.

Next, the honeycomb body 100, on which the paste 140 is coated, is fired, and the honeycomb structure 10 can be provided.

Next, a catalyst made of catalytic metal such as platinum is held by the bulkheads 11 of the honeycomb structure 10. In this way, the exhaust gas purifying filter 1 can be obtained as shown in FIG. 7.

The thus obtained exhaust gas purifying filter 1 is made of cordierite ceramics. The shape of the exhaust gas purifying filter 1 is, for example, a cylinder or elliptic cylinder, and the diameter is 50 to 300 mm and the length between both end faces 191, 192 is 50 to 250 mm.

For example, area A of the large opening portion 131 is 2 to 3 mm$^2$, and area B of the small opening portion 132 is not more than 0.25 mm$^2$. The plug member 14 arranged in the small opening portion 132 is 1 to 4 mm in thickness.

Next, the operation and effect of this embodiment will be explained below.

When the exhaust gas purifying filter 1 is manufactured, the bulkheads 11 at the opening portion 13 of the cell 12 of the honeycomb body 100 are deformed. Ceramic material composing the bulkheads 11 contains organic binder. Therefore, when the bulkheads 11 are heated, they can be softened. When the bulkheads 11 are given a pushing force under the condition that they are softened, the bulkheads 11 can be easily deformed.

The above ceramic material contains thermo-plastic resin. Therefore, the bulkheads can be more easily deformed.

In this case, as shown in FIG. 1, the aforementioned pushing force is given by the tapered jig 3 inserted into the opening 13 of the cell 12 of the honeycomb body 100. The above bulkheads 11 are deformed by the pushing force. Therefore, the bulkheads 11 located around the cell 12, into which the tapered jig 3 is inserted, are greatly expanded along the tapered shape of the forward end portion 31 of the tapered jig 3 as shown by arrow G. Therefore, the opening portion 13 of the cell 12, into which the tapered jig 3 is inserted, becomes the large opening portion 131 as described before. On the other hand, the opening portion 13 of the adjoining cell 12 becomes the small opening portion 132, the opening portion 13 of which is reduced, because the bulkheads 11 are necessarily deformed as shown in FIGS. 3B and 5.

The exhaust gas purifying filter 1 obtained by the above manufacturing method has the small opening portion 132 at one end of the cell 12 as shown in FIGS. 6 and 7. Therefore, a flow-out of the exhaust gas 4, which has been introduced into the cell 12, from the small opening portion 132 is restricted, and the exhaust gas 4 passes through the bulkheads 11 and moves to the adjoining cell 12. Due to the foregoing, particulates contained in the exhaust gas 4 are collected by the bulkheads 11.

The small opening portion 132 is composed when the bulkheads 11 having a particulate collecting function are deformed. Therefore, even at the end of the cell 12, that is, even in the periphery of the small opening portion 132, the exhaust gas 4 can be sufficiently purified when it passes through the bulkheads 11. For the above reasons, it is possible to enhance the purifying efficiency of the exhaust gas 4.

The exhaust gas purifying filter 1 has the large opening portions 131 at one end of the cell 12 as shown in FIGS. 6 and 7. Therefore, even if particulates accumulate on the end faces 191, 192 of the exhaust gas purifying filter 1, a sufficiently large opening area can be ensured, and the exhaust gas 4 can be smoothly introduced and discharged.

Since area A of the large opening portion 131 and area B of the small opening portion 132 are kept in the relation of $0<B/A \leq 0.25$, the exhaust gas 4 can be smoothly introduced and exhausted, and the purifying efficiency of the exhaust gas 4 can be enhanced.

The bulkheads 11 are heated when the heated tapered jig 3 is contacted with the bulkheads 11. Therefore, the bulkheads 11 at the opening portion 13 of the cell 12 can be positively softened. Accordingly, the bulkheads 11 can be positively deformed into a desired shape.

As shown in FIG. 1, the forward end portion 31 of the tapered jig 3 is substantially formed into a cone. Therefore, the tapered jig 3 can be smoothly inserted into the opening portion 13 of the cell 12, and the bulkheads 11 can be smoothly deformed.

The small opening portion 132 of the honeycomb body 100 is coated with the paste 40 and then fired. Due to the foregoing, the small opening portion 132 of the cell 12 of the exhaust gas purifying filter 1 is blocked by the plug member 14. Therefore, leakage of the exhaust gas 4 from the small opening portion 132 can be further restricted, and the purifying efficiency of the exhaust gas 4 can be further enhanced.

As described above, according to this embodiment, it is possible to provide an exhaust gas purifying filter and method of manufacturing the exhaust gas purifying filter characterized in that the purifying efficiency is high, the exhaust gas can be smoothly introduced and discharged and the exhaust gas purifying filter can be easily manufactured.

Embodiment 2

Figure 8:
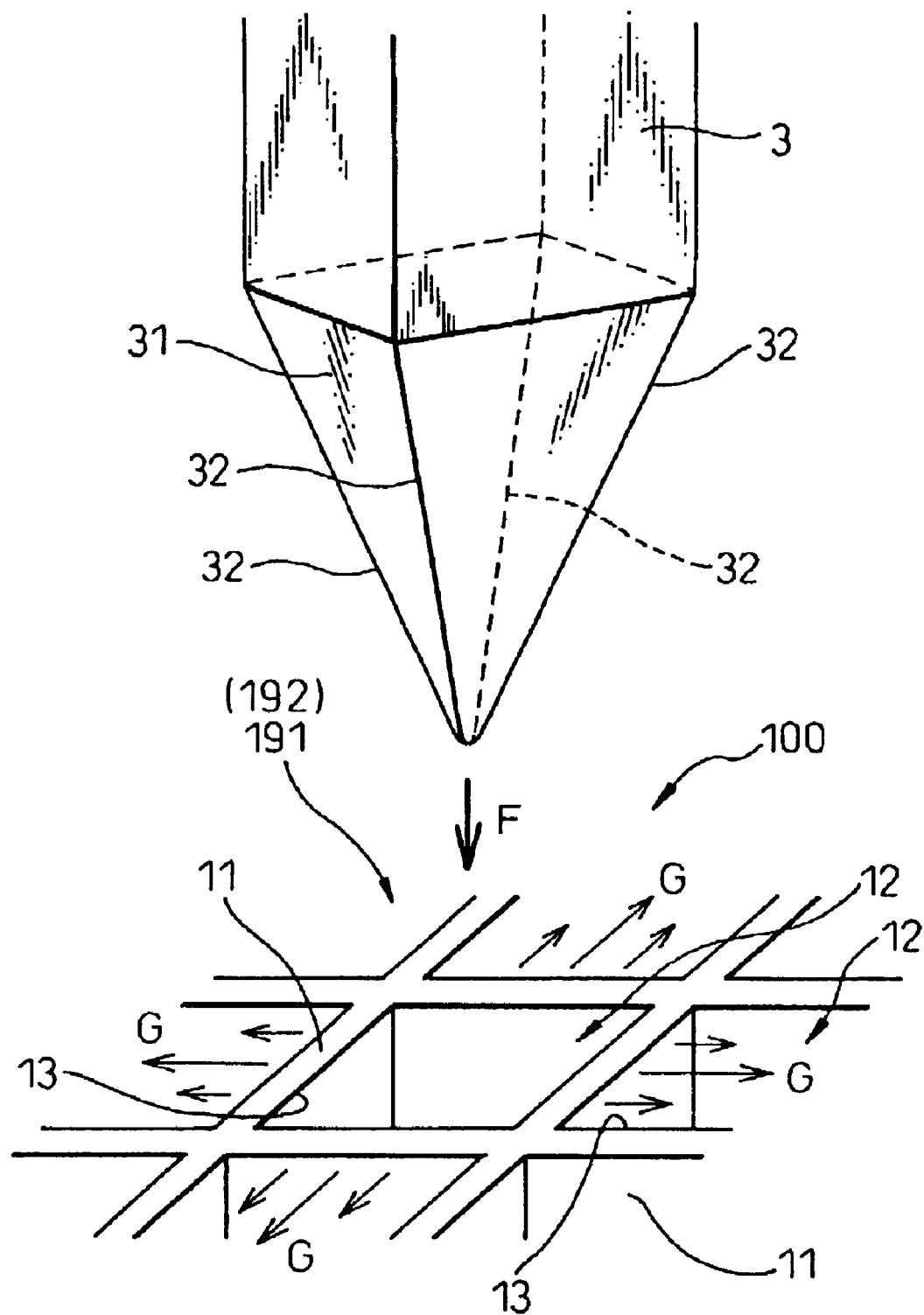
FIG. 8 is a schematic illustration of a method of manufacturing an exhaust gas purifying filter of Embodiment 2 of the present invention.
Figure 9:
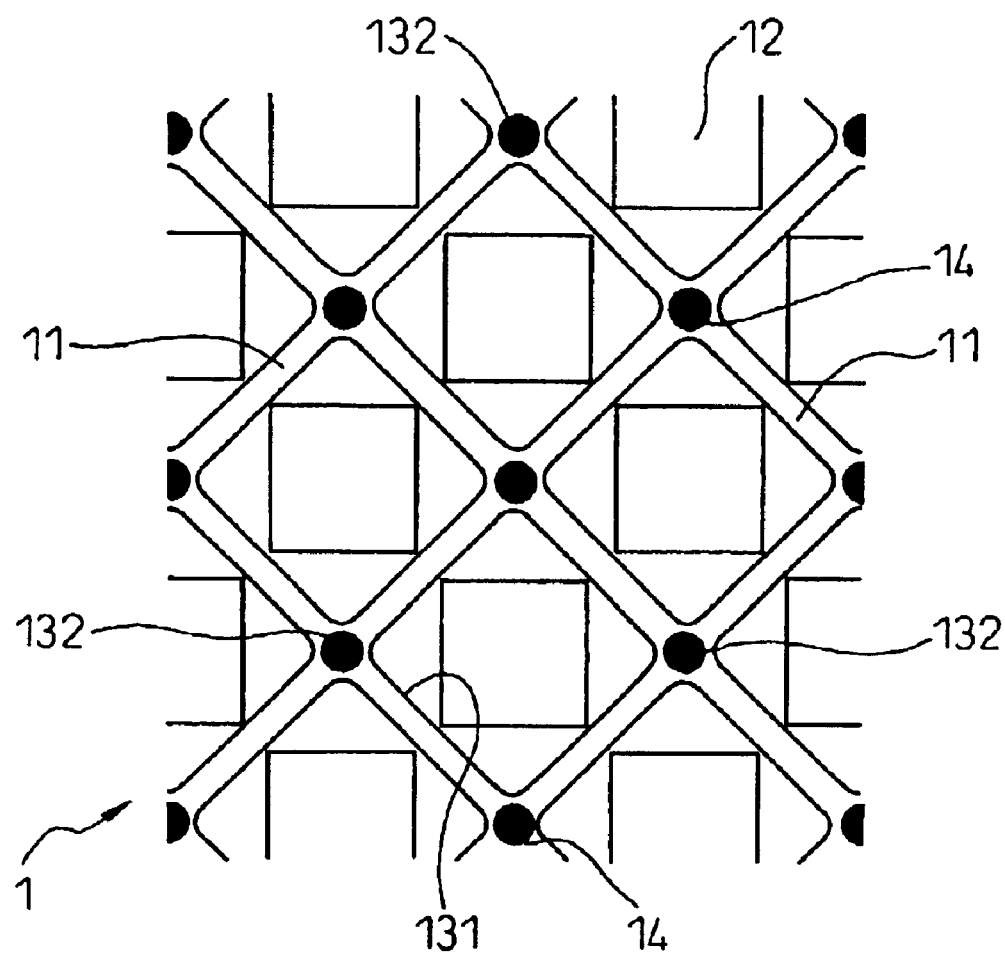
FIG. 9 is a schematic illustration of an exhaust gas purifying filter of Embodiment 2 of the present invention, wherein the view is taken from an end face.

In this embodiment, the forward end portion 31 of the tapered jig 3 used for deforming the bulkheads 11 is substantially formed into a quadrangular pyramid as shown in FIGS. 8 and 9.

In this case, when the forward end portion 31 of the tapered jig 3 is inserted into the opening portion 13 of the cell 12 of the honeycomb body 100, the corners 32 of the forward end portion 31 are respectively made to come into contact with the substantial centers of the sides of the opening portion 13 as shown in FIG. 8.

In the thus obtained exhaust gas purifying filter 1, the large opening portion 131 is formed into a substantial square as shown in FIG. 9.

Other points of the construction are the same as those of Embodiment 1.

The operation and effect of this embodiment are the same as those of Embodiment 1.

Embodiment 3

In this embodiment, the honeycomb body 100 is fired before the paste 140 is coated.

After the bulkheads 11 of the cell 12 of the honeycomb body 100 have been deformed, the honeycomb body 100 is fired. After that, the paste 140 is coated, and then the honeycomb body 100 is fired again.

Other points are the same as those of Embodiment 1.

In this case, the percent defective of defectives caused in the process of firing can be reduced.

The operation and effect of this embodiment are the same as those of Embodiment 1.

Embodiment 4

In this embodiment, before the bulkheads 11 of the cell 12 of the honeycomb body 100 are deformed, that is, when the bulkheads 11 of the cell 12 of the honeycomb body 100 are in the state shown in FIG. 3A, the opening portion 13 to be formed into the small opening portion 132 is coated with the paste 140.

That is, after the paste 140 has been coated, the bulkheads 11 are deformed, and then the honeycomb body 100 is fired.

Other points are the same as those of Embodiment 1.

In this case, the small opening can be easily blocked or reduced.

The operation and effect of this embodiment are the same as those of Embodiment 1.

Embodiment 5

Figure 10:
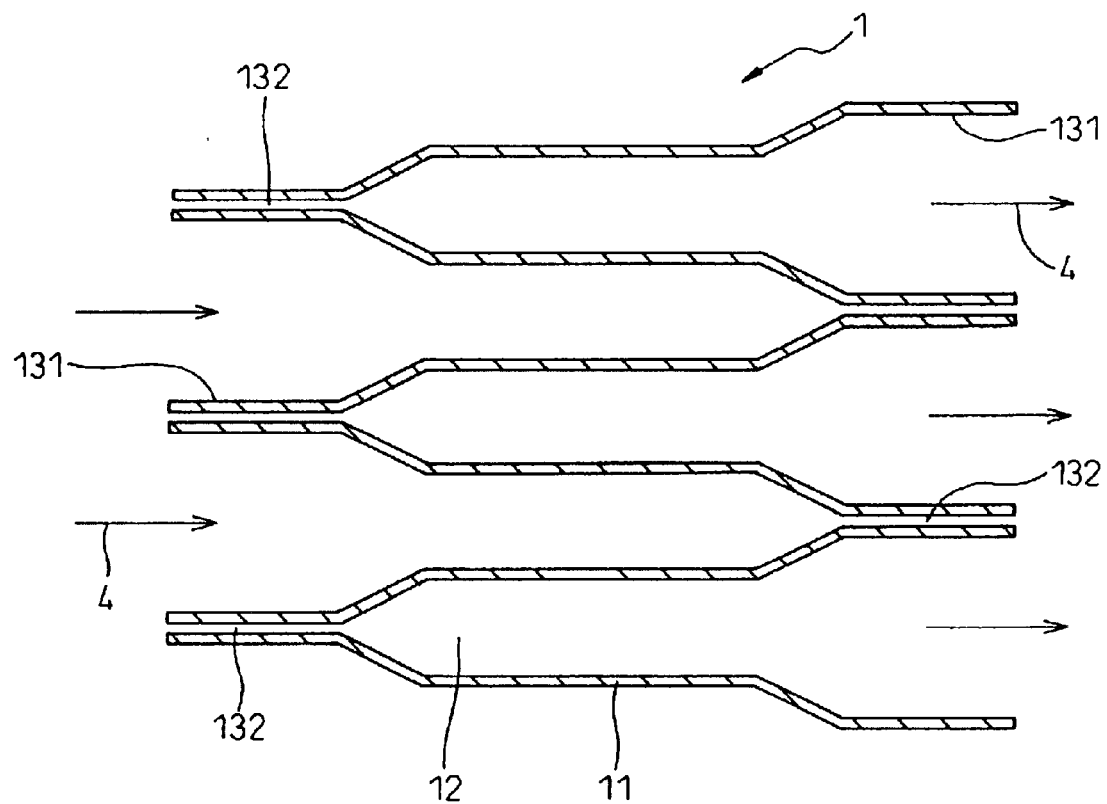
FIG. 10 is a sectional schematic illustration showing an exhaust gas purifying filter of Embodiment 5 of the present invention.

In this embodiment, the exhaust gas purifying filter 1 is composed as follows. When the opening portion of the cell 12 is drawn so that the bulkheads 11 of the cell 12 can become parallel with each other as shown in FIG. 10, the small opening portion 132 is formed.

The small opening portion 13 is formed in such a manner that the bulkheads 11 of the cell 12 are reduced over the length of 1 to 5 mm under the condition that the reduced portions become parallel with each other.

In the exhaust gas purifying filter of this embodiment, no plug member is arranged.

Other points are the same as those of Embodiment 1.

In this case, even if the plug member is not arranged in the small opening portion 132, a flow of the exhaust gas from the cell 12 can be effectively suppressed.

The plug member may be arranged in the small opening portion 132 in this embodiment. In this case, a flow of the exhaust gas from the cell 12 can be more effectively suppressed.

Therefore, the purifying efficiency of purifying the exhaust gas 4 can be more enhanced.

Other points are the same as those of Embodiment 1.

Embodiment 6

As shown in FIGS. 11 to 18, in this embodiment, there is provided a method of manufacturing an exhaust gas purifying filter in which the paste 140 is arranged in the small opening portion 132 by blowing the air 5 in the case where the plug member 14 is formed in the small opening portion 132 of the honeycomb body 100.

Figure 11:
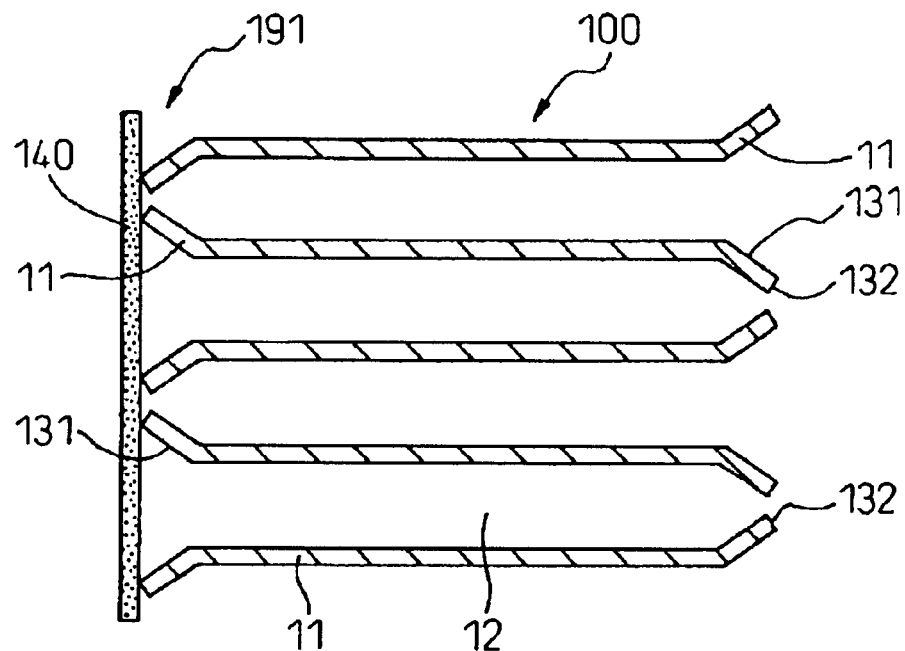
FIG. 11 is a sectional schematic illustration of a honeycomb body in a state in which paste is coated on an end face in Embodiment 6 of the present invention.

First, as shown in FIG. 11, on one end face 191 of the honeycomb body 100 (shown in FIGS. 3(B) and 5) in which the bulkheads 11 have been deformed, the paste 140, which becomes the plug member 14 for blocking the small opening portion 132 of the honeycomb body 100, is coated.

Figure 12:
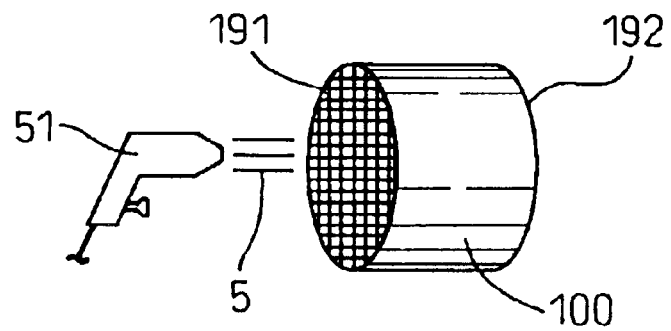
FIG. 12 is a schematic illustration showing a method in which paste is moved when air is blown to an end face of a honeycomb body in Embodiment 6.
Figure 13:
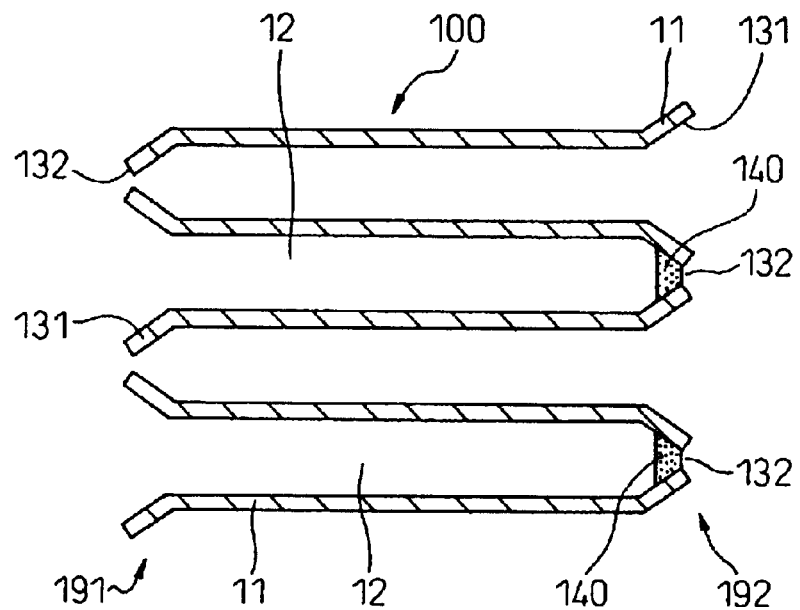
FIG. 13 is a sectional schematic illustration of a honeycomb body in a state in which a small opening portion on one end face is plugged in Embodiment 6.

Next, as shown in FIG. 12, the air 5 is blown onto the end face 191. Due to the foregoing, the paste 140, which has been coated in the large opening portion 131 on the end face 191, is moved in the cell 12 to the small opening portion 132 on the other end face 192 as shown in FIG. 13. After the small opening portion 132 has been plugged, it is fired.

Figure 14:
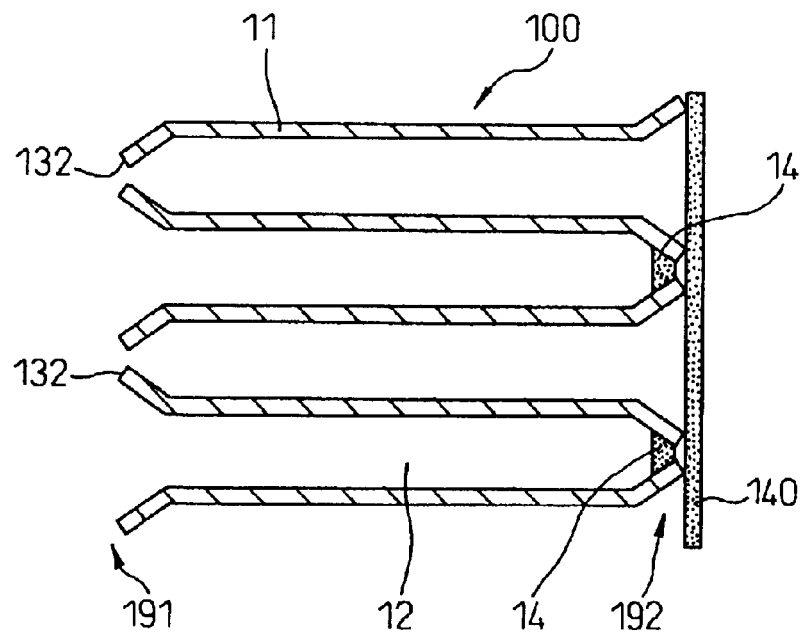
FIG. 14 is a sectional schematic illustration of a honeycomb body in a state in which paste is coated on an end face in Embodiment 6.
Figure 15:
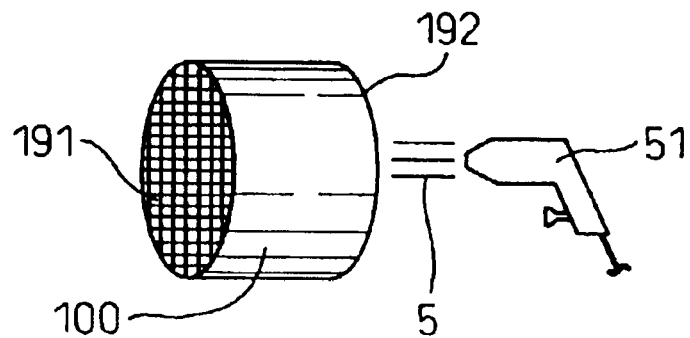
FIG. 15 is a schematic illustration showing a method in which paste is moved when air is blown to an end face of a honeycomb body in Embodiment 6.
Figure 16:
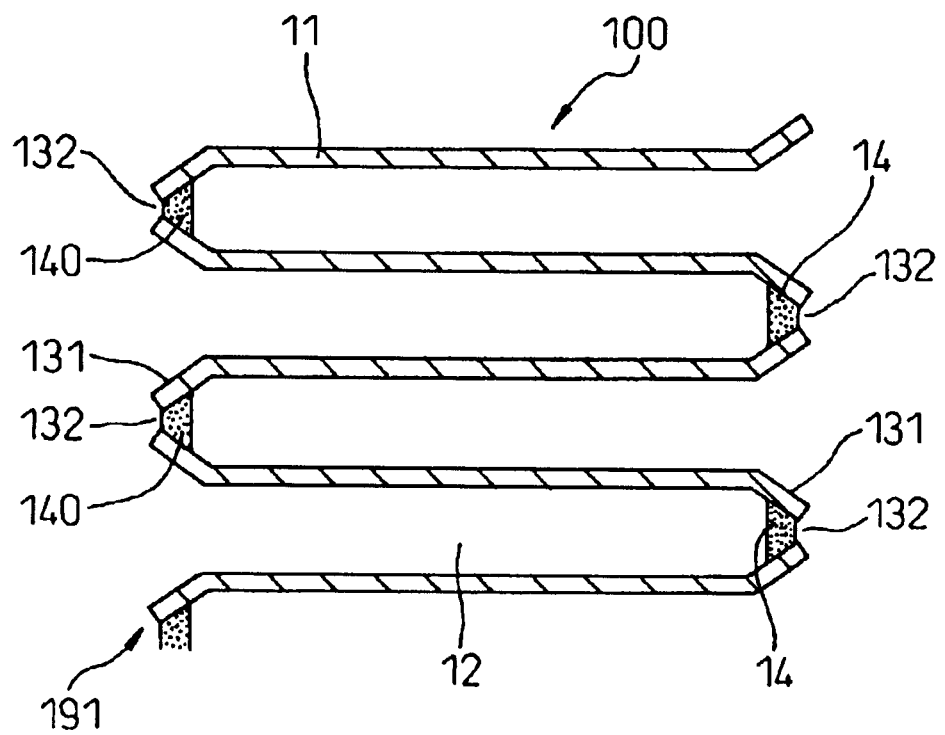
FIG. 16 is a sectional schematic illustration of a honeycomb body in a state in which small opening portions on both end faces have been plugged.

Further, as shown in FIGS. 14 to 16, the small opening portion 132 on the end face 191 on the opposite side is plugged with the paste 140 by the same method and then fired.

The more detail will be explained below. The paste 140 is coated in such a manner that one end face 191 of the honeycomb body 100 is dipped in the same paste 140 as that of Embodiment 1. Due to the foregoing, as shown in FIG. 11, the paste 140 is coated all over the end face 191.

Figure 18:
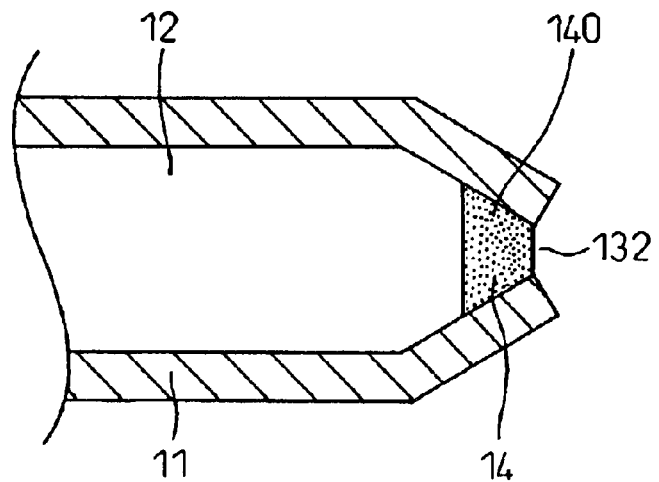
FIG. 18 is an enlarged sectional view of a small opening portion, which has been plugged, of Embodiment 6.
Figure 19:
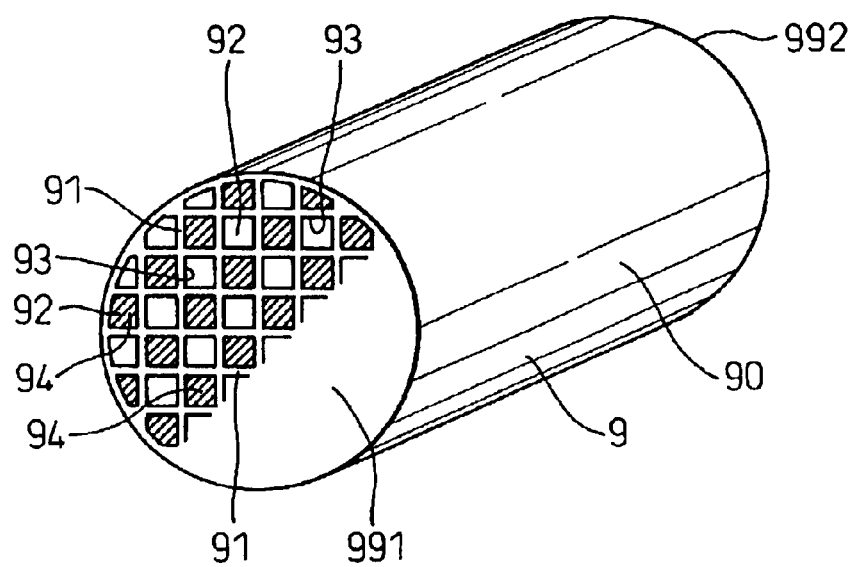
FIG. 19 is a perspective view of an exhaust gas purifying filter of a conventional example.
Figure 20:
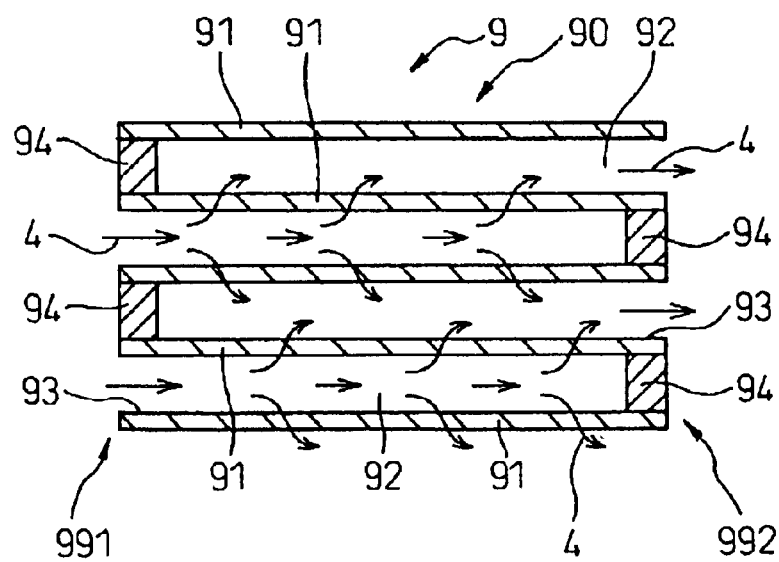
FIG. 20 is a sectional schematic illustration of an exhaust gas purifying filter of a conventional example.

Next, as shown in FIG. 12, the air 5 is blown onto the end face 191 with the air gun 51. Then, the paste 140, which has been coated in the large opening portion 131 on the end face 191, is moved in the cell 12 to the small opening portion 132 on the end face 192 on the opposite side. At this time, a relatively large quantity of paste 140 adhering to the large opening portion 131 gathers to the small opening portion 132. Therefore, most of the paste 140 does not pass through the small opening portion 132 but stays in the small opening portion 132 as shown in FIG. 18.

Figure 17:
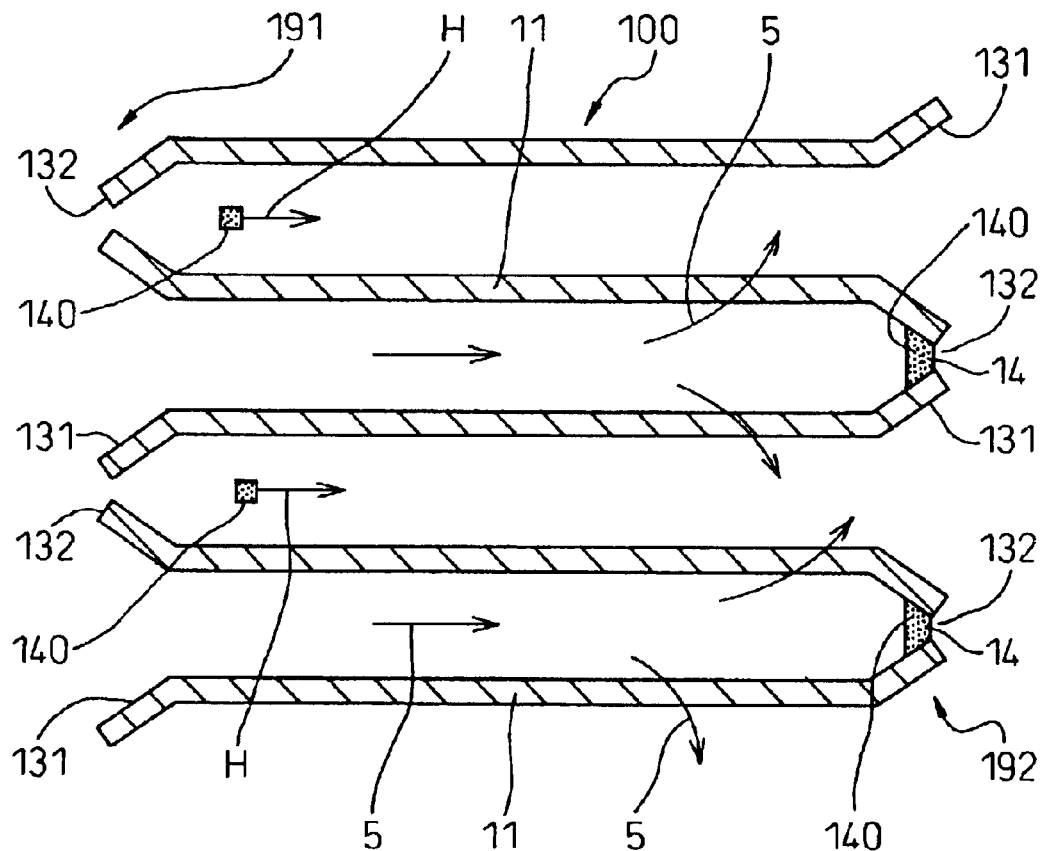
FIG. 17 is a sectional schematic illustration for explaining a state in which paste and air are moved in Embodiment 6.

Since the bulkheads 11 of the honeycomb body 100 are porous, the air 5 passes through the bulkheads 11 as shown in FIG. 17.

A relatively small quantity of paste 140, which has been coated in the small opening portion 132 on one end face 191 by means of dipping, comes out from the small opening portion 132 due to the air 5 as shown by arrow H in FIG. 17 and is discharged outside from the large opening portion 131 on the other end face 192.

After that, the paste 140 staying in the small opening portion 132 on the end face 192 is fired and is formed into the plug member 14.

When the plug member 14 is formed in the small opening portion 132 on the end face 191 on the opposite side, as shown in FIG. 14, the other end face 192 is dipped in the paste 140 so as to coat the paste 140. Next, as shown in FIG. 15, the air 5 is blown onto the end face 192. Due to the foregoing, as shown in FIG. 16, the paste 140 is moved to the other end face 191, so that the small opening portion 132 on the end face 191 is filled with the paste 140. This mechanism is the same as that of the case in which the plug member 14 is formed in the small opening portion 132 on one end face 192 described above as shown in FIGS. 11 to 13.

At this time, the plug member 14, which is arranged in the small opening portion 132 on the end face 192, has already been fired and fixed. Therefore, the plug member 14, which is arranged in the small opening portion 132 on the end face 192, does not come out from the small opening portion 132 by the air 5.

After that, the paste 140, which has been filled in the small opening portion 132 on the end face 191, is fired and formed into the plug member 14.

In the manner described above, the plug members 14 can be formed in the small opening portions 132 on both end faces 191 and 192 of the honeycomb body 100.

Other points of this embodiment are the same as those of Embodiment 1.

In this case, leakage of the exhaust gas from the small opening portion 132 can be effectively suppressed. Therefore, it is possible to provide an exhaust gas purifying filter by which the purifying efficiency of the exhaust gas can be more enhanced.

Further, it is possible to provide an advantage that the small opening portion can be positively blocked or reduced.

Other points of this embodiment are the same as those of Embodiment 1.

In this connection, in the Embodiments 1 to 4 and 6 described above, the small opening portion 132 is blocked by the plug member 14. However, it should be noted that the plug member 14 may be made to be a partial plug and the small opening portion 132 may not be completely blocked.

In the exhaust gas purifying filters of Embodiments 1 to 6 described before, the catalyst is held by the honeycomb structure 10. However, it is possible to use an exhaust gas purifying filter 1 in which the catalyst is not held.

In the exhaust gas purifying filters of Embodiments 1 to 6 described before, a sectional shape of the cell 12 composing the honeycomb structure is square. However, it is possible to apply the present invention to a honeycomb structure, the sectional shape of the cell of which is triangular or another shape.

As explained before, examples of the organic binder used in the present invention are methyl cellulose, hydroxy methyl cellulose and others.

Examples of the internal combustion engine are a Diesel engine and others.

It is preferable that the small opening portion is arranged adjacent to the large opening portion by firing the opening portion of the cell when the bulkheads are deformed.

In the above structure, a flow of the exhaust gas, which has been introduced into the cell, from the small opening portion is restricted, and the exhaust gas passes through the bulkheads and moves to the adjoining cell. Due to the foregoing, particulates in the exhaust gas are collected by the bulkheads.

The above small opening portion is formed when the bulkheads having a function of collecting particulates are deformed. Therefore, even at the end portion of the cell, that is, even in the periphery of the small opening portion, the exhaust gas can be sufficiently purified when the exhaust gas passes through the bulkheads.

It is preferable that area A of the large opening portion and area B of the small opening portion before firing are kept in the relation of $0<B/A\leq 0.25$.

In this case, in the thus obtained exhaust gas purifying filter, the large opening portion is much larger than the small opening portion. Therefore, the exhaust gas can be smoothly introduced and discharged and, further, the purifying efficiency of purifying the exhaust gas can be enhanced.

In the case of $B/A>0.25$, leakage of the exhaust gas from the small opening portion is increased. Accordingly, it becomes difficult to obtain a sufficiently high purifying efficiency. Further, there is a possibility that particulates accumulate in the large opening portion and the exhaust gas cannot be smoothly introduced and discharged.

It is preferable that the small opening portion of the honeycomb body is coated with paste which becomes a plug member for blocking or reducing the small opening portion concerned and then the honeycomb body is fired. In this case, leakage of the exhaust gas from the small opening portion can be further suppressed and the purifying efficiency of purifying the exhaust gas can be further enhanced.

In the above case, paste can be coated after the bulkheads have been deformed.

In this case, the small opening portion can be positively blocked or reduced.

After the bulkheads have been deformed, paste, which becomes a plug member for blocking or reducing the small opening portion of the honeycomb body, is coated on one end face of the honeycomb body, and when air is blown onto the end face, part of the paste, which has been coated on the large opening portion of the end face, is moved in the cell to the small opening portion on the other end face so as to plug the small opening portion on the other end face, and then the paste is fired, and further the small opening portion on the end face on the opposite side is plugged with paste by the same method and then the paste is fired.

In this case, leakage of the exhaust gas from the small opening portion can be further suppressed and the purifying efficiency of purifying the exhaust gas can be further enhanced.

Further, it is possible to provide an advantage that the small opening portion can be positively blocked or reduced.

Before the paste is coated, the honeycomb body can be fired.

In this case, the percent defective of defectives caused in the process of firing can be reduced.

In the opening portion of the honeycomb body, the paste, which becomes a plug member for closing or reducing the small opening portion, may be coated in the opening portion which must be formed into the small opening portion, before the bulkheads are deformed, and then deforming and firing may be conducted In this case, the small opening portion can be easily blocked and reduced.

It is preferable that the ceramic material contains thermoplastic resin. In this case, the bulkheads can be more easily softened and the bulkheads can be more easily deformed.

Examples of the above thermo-plastic resin are acrylate resin, stearic acid methyl, vinyl chloride resin and others.

It is preferable that the bulkheads are heated when the heated tapered jig is made to come into contact with the bulkheads. In this case, the bulkheads of the opening portion of the cell can be positively softened. Therefore, the bulkheads can be easily and positively deformed into a desired shape.

It is preferable that a forward end portion of the tapered jig is a substantial cone or quadrangular pyramid. In this case, the tapered jig can be smoothly inserted into the opening portion of the cell, and the bulkheads can be smoothly deformed.

In the present invention, in the case of $B/A>0.25$, leakage of the exhaust gas from the small opening portion is increased. Therefore, it becomes difficult to obtain a sufficiently high purifying efficiency. Further, there is a possibility that particulates accumulate in the large opening portion and the exhaust gas cannot be smoothly introduced and discharged.

It is preferable that the small opening portion is blocked or reduced by a plug member. In this case, leakage of the exhaust gas from the small opening portion can be further suppressed, and the purifying efficiency of purifying the exhaust gas can be more enhanced.

In the present invention, the small opening portion may be formed by reducing the opening portion of the cell so that the bulkheads of the cell can become substantially parallel with each other.

In this case, even if the plug member is not arranged in the small opening portion, a flow of the exhaust gas from the cell can be effectively suppressed. When the plug member is arranged in the small opening portion, a flow of the exhaust gas from the cell can be more effectively suppressed. Therefore, the purifying efficiency of purifying the exhaust gas can be more enhanced.

While the invention has been described by reference to specific embodiments chosen for purposes of illustration, it should be apparent that numerous modification could be made thereto by those skilled in the art without departing from the basic concept and scope of the invention.

What is claimed is:

1. A method of manufacturing an exhaust gas purifying filter for purifying exhaust gas by collecting particulates contained in exhaust gas exhausted from an internal combustion engine, comprising the steps of:

making a honeycomb body having bulkheads, which are formed into a honeycomb-shape, and also having a plurality of cells, which are partitioned by the bulkheads and penetrate both end faces, when ceramic material containing organic binder is formed into the honeycomb body by extrusion, dried and cut into a predetermined length;

inserting a tapered jig having a tapered forward end portion into an opening portion of the cell of the honeycomb body;

heating the bulkheads so as to soften them;

deforming the bulkheads by a pushing force given by the tapered jig so that the opening portion of the cell is expanded and a large opening portion is formed and an opening portion of the adjoining cell is reduced; and firing the honeycomb body.

2. A method of manufacturing an exhaust gas purifying filter according to claim 1, wherein a small opening portion is formed adjacent to the large opening portion by reducing the opening portion of the cell when the bulkheads are deformed.

3. A method of manufacturing an exhaust gas purifying filter according to claim 2, wherein an inequality 0<B/A≦0.25 is established where an area of the large opening portion before firing is A, and an area of the small opening portion is B.

4. A method of manufacturing an exhaust gas purifying filter according to claim 2, wherein the small opening portion is formed by reducing the opening portion of the cell so that the bulkheads of the cell can become substantially parallel with each other.

5. A method of manufacturing an exhaust gas purifying filter according to claim 2, wherein the small opening portion of the honeycomb body is coated with paste which becomes a plug member for blocking or reducing the small opening position.

6. A method of manufacturing an exhaust gas purifying filter according to claim 5, wherein the paste is coated after the bulkheads have been deformed.

7. A method of manufacturing an exhaust gas purifying filter according to claim 2 wherein, after the bulkheads have been deformed, paste, which becomes a plug member for blocking or reducing a small opening portion of the honeycomb body, is coated on one end face of the honeycomb body and, when air is blown onto the end face, part of the paste, which has been coated on a large opening portion of the end face, is moved in the cell to a small opening portion on the other end face so as to plug the small opening portion on the other end face, and then the paste is fired and, further, a small opening portion on an end face on the opposite side is plugged with paste by the same method and then the paste is fired.

8. A method of manufacturing an exhaust gas purifying filter according to claim 5, wherein the honeycomb body is fired before the paste is coated.

9. A method of manufacturing an exhaust gas purifying filter according to claim 2, wherein in the opening portion of the honeycomb body, the paste, which becomes a plug member for blocking or reducing the small opening portion, is coated in the opening portion which must be formed into the small opening portion, before the bulkheads are deformed, and then the honeycomb body is deformed and fired.

10. A method of manufacturing an exhaust gas purifying filter according to claim 1, wherein the ceramic material contains thermo-plastic resin.

11. A method of manufacturing an exhaust gas purifying filter according to claim 1, wherein the bulkheads are heated when the heated tapered jig is made to come into contact with the bulkheads.

12. A method of manufacturing an exhaust gas purifying filter according to claim 1, wherein a forward end portion of the tapered jig is a substantial cone or quadrangular pyramid.

13. An exhaust gas purifying filter for collecting particulates contained in exhaust gas exhausted from an internal combustion engine so as to purify the exhaust gas, comprising a honeycomb structure having honeycomb-shaped bulkheads and also having a plurality of cells partitioned by the bulkheads and penetrating both end faces, wherein each cell has a large opening portion which is formed by expanding one opening portion and also has a small opening portion which is formed by reducing the other opening portion, the large opening portion and small opening portion are arranged adjacent to each other on both end faces of the honeycomb structure, and a relation between area A of the large opening portion and area B of the small opening portion is expressed by an inequality of 0<B/A≦0.25, and wherein each large opening portion has a tapered surface extending to the respective end face of the honeycomb structure and each small opening portion has a tapered surface extending to the respective end face of the honeycomb structure.

14. An exhaust gas purifying filter according to claim 13, wherein the small opening portion is blocked or reduced by a plug member.

15. An exhaust gas purifying filter according to claim 13, wherein the small opening portion is formed by drawing the opening portion of the cell so that the bulkheads of the cell can become substantially parallel with each other.

* * * * *